Jan. 2, 1968  R. H. RENO  3,361,396
AIRCRAFT HAVING A DETACHABLE POD
Filed May 27, 1961  10 Sheets-Sheet 1

INVENTOR.
Robert H. Reno
BY
His Attorneys

INVENTOR.
Robert H. Reno
BY
His Attorneys

United States Patent Office 3,361,396
Patented Jan. 2, 1968

3,361,396
AIRCRAFT HAVING A DETACHABLE POD
Robert H. Reno, 133 Columbia Turnpike,
Rensselaer, N.Y. 12144
Filed May 27, 1961, Ser. No. 129,197
15 Claims. (Cl. 244—118)

This invention relates to aircraft having detachable cargo pods.

This application is a continuation-in-part of my prior co-pending application for United States Letters Patent entitled, "Airplane Having a Detachable Pod," which was filed Nov. 15, 1957, and which bears Ser. No. 696,-658, now abandoned.

The principal object of my invention is to provide a detachable cargo-carrying device which may be used without substantial change as a pod on an airplane and the body of a ground conveyance such as a truck or trailer truck.

Another object is to provide an airplane having a landing gear by means of which the airplane may be raised to such an elevation that a truck or tractor-trailer combination can be run beneath it.

Another object is to provide the plane with means for raising the body of the ground conveyance, after it has been detached from its chassis, into contact with the fuselage of the plane, and means for securing it thereto as a pod.

Another object is to provide the top of the body of the ground conveyance and the bottom of the fuselage with means adapted to cooperate for more efficiently connecting the two for safety in flight operations and better structural integration.

Still another object of my invention is to provide a mechanism for tilting the airplane in order to accomplish a shorter take-off run.

I accomplish these objects by the means described below and illustrated in the accompanying drawings, in which.

Figures 1, 2:
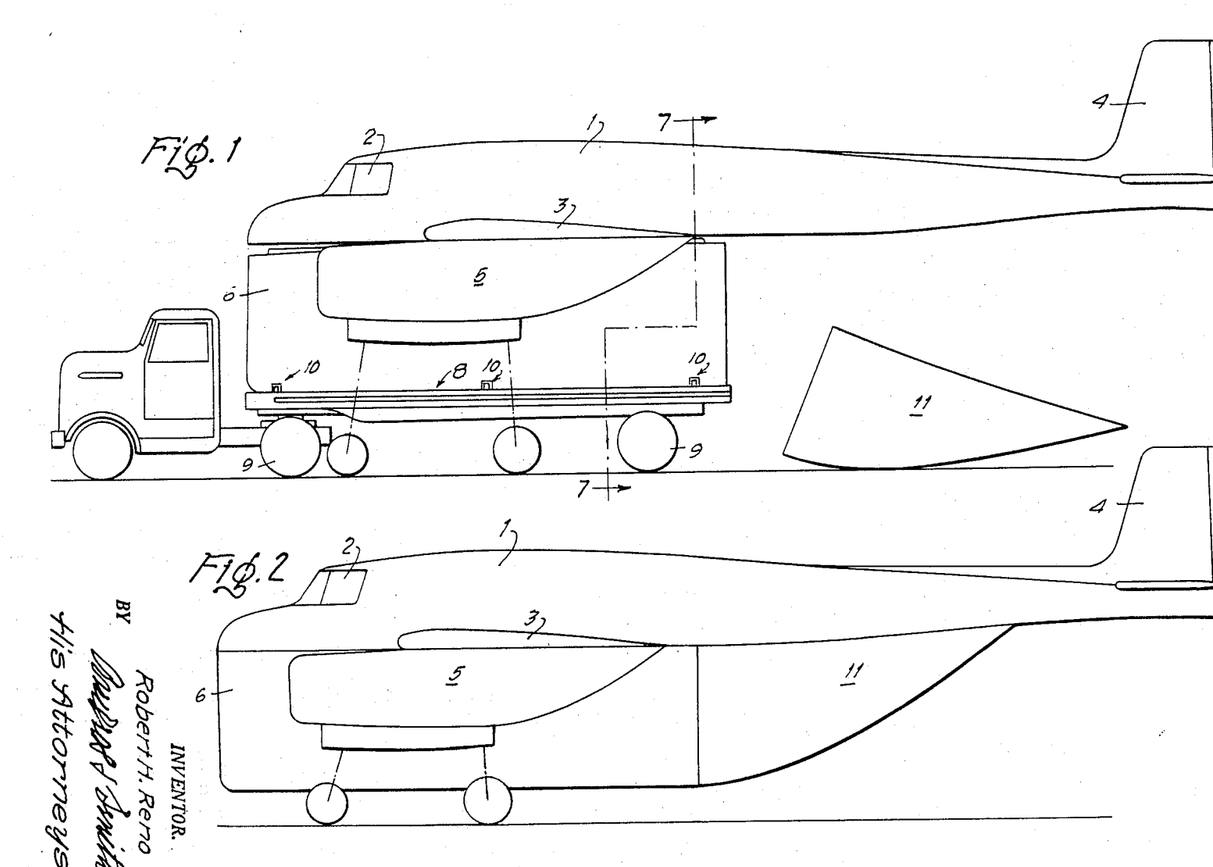
FIG. 1 is a more or less diagrammatic side elevation view of the airplane with a trailer truck positioned beneath it and showing detached from the body of the truck a fairing adapted for attachment to the rear of the truck body.
FIG. 2 is a view similar to FIG. 1 showing the truck body attached to the airplane as a pod, and the fairing attached to the pod.
Figure 3:
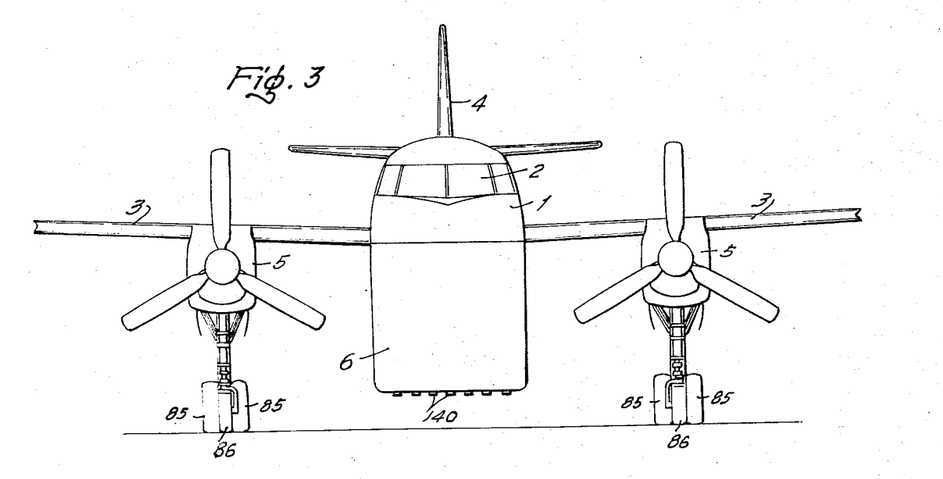
FIG. 3 is a front elevation view of the airplane with the truck body or pod secured thereto; the ends of the wings of the plane being broken away.

Referring to the drawings and first to FIGS. 1 and 2, the airplane comprises a fuselage 1, a pilot's compartment 2, wings 3, conventional empennage surfaces 4, and engine nacelles 5 into which the landing gear is retractable during flight.

FIG. 1 shows the landing gear fully extended so that the fuselage of the airplane is raised to an elevation sufficient to allow the body 6 of a trailer truck to be run beneath it. The front of the truck body is aerodynamically contoured, as best shown at 7 in FIG. 4. The trailer truck in addition to the body comprises a chassis having a platform 8 and wheels 9. The body is detachably secured to the chassis by means 10 which will be later described in detail. The airplane is provided with means, which will also be later described, for raising the body 6 into contact with and securing it to the fuselage 1 to form the pod of the plane.

In order to reduce the drag of the pod while in flight there is attached to the rear end thereof a fairing 11 which is preferably formed of a fiberglass shell and which will be later described together with the means for securing it to the rear end of the pod.

Figures 4, 5:
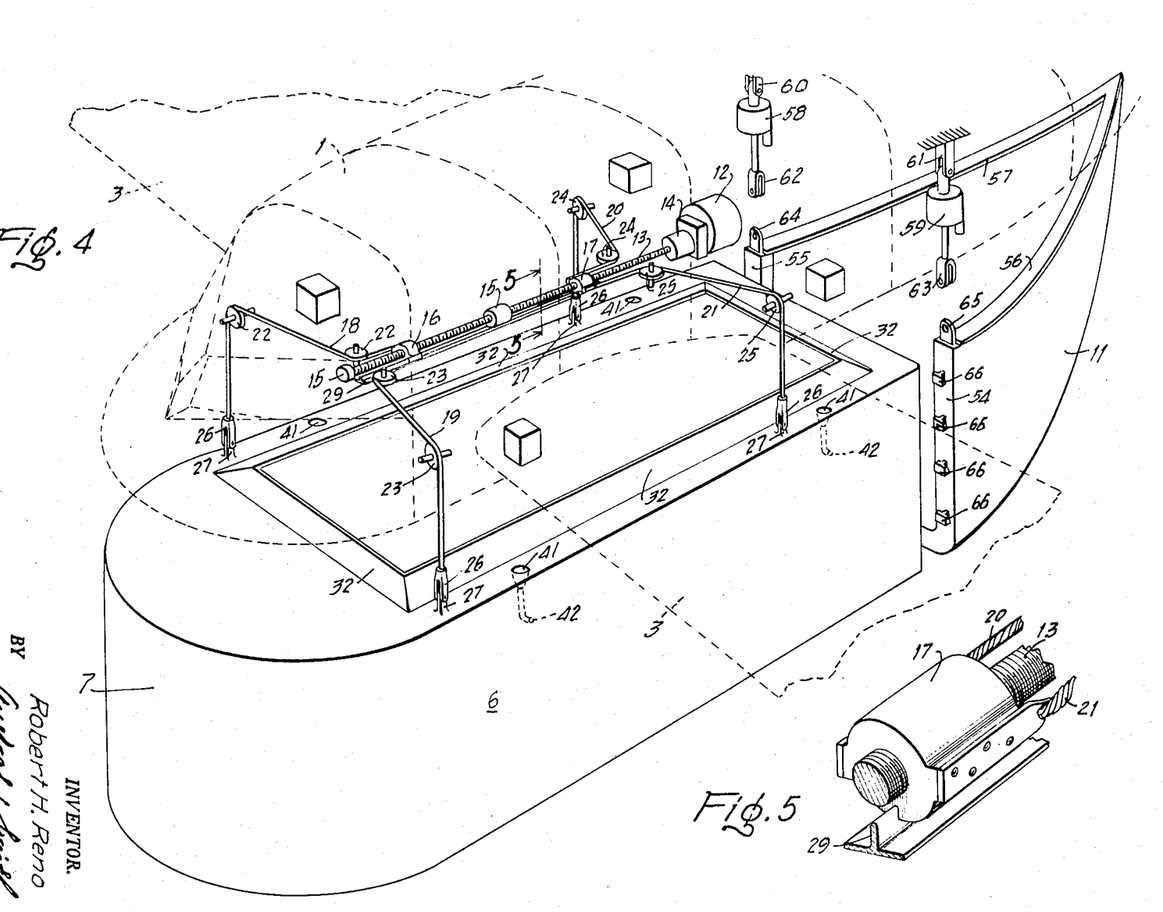
FIG. 4 is a diagrammatic perspective view showing a portion of the airplane in dotted outline and, in solid lines, the pod, the fairing, and means on the airplane for raising the pod or truck body and fairing into positions for attachment to the plane.
FIG. 5 is an enlarged perspective view of a part of the apparatus on the airplane which functions to raise the pod into contact with the bottom of the fuselage of the plane.

Referring now to FIGS. 4 and 5, which show the means for raising the pod or truck body into contact with the fuselage, 6 is the pod and 11 is the fairing. 12 is a reversible electric motor which drives the worm 13 through suitable reduction gearing 14. The worm rotates in bearings or bushings 15, and mounted thereon are two followers 16 and 17, one of which is shown in detail in FIG. 5. Attached to the follower 16 are cables 18 and 19, and attached to the follower 17 are cables 20 and 21. The cable 18 is guided outwardly and downwardly by the pulleys 22; the cable 19 by the pulleys 23; and the pulleys 24 and 25, respectively, guide the cables 20 and 21. At the bottom of each cable is a clevis 26 which is secured to the upstanding projection 27 on the pod by means of pins 28 (see FIG. 8). Since the followers 16 and 17 must move in opposite directions, if the portion of the worm on which the traveler 16 moves has a right-hand thread, that portion on which the follower 17 moves must have a left-hand thread. The followers ride on the track 29 (see FIG. 5) and are thus prevented from turning. The cables 18, 19, 20 and 21 are guided through the fuselage surface by cable guide buildings 30 (see FIG. 8). These bushings are threaded into castings 31 which are rigidly secured to the fuselage.

Figures 6, 7:
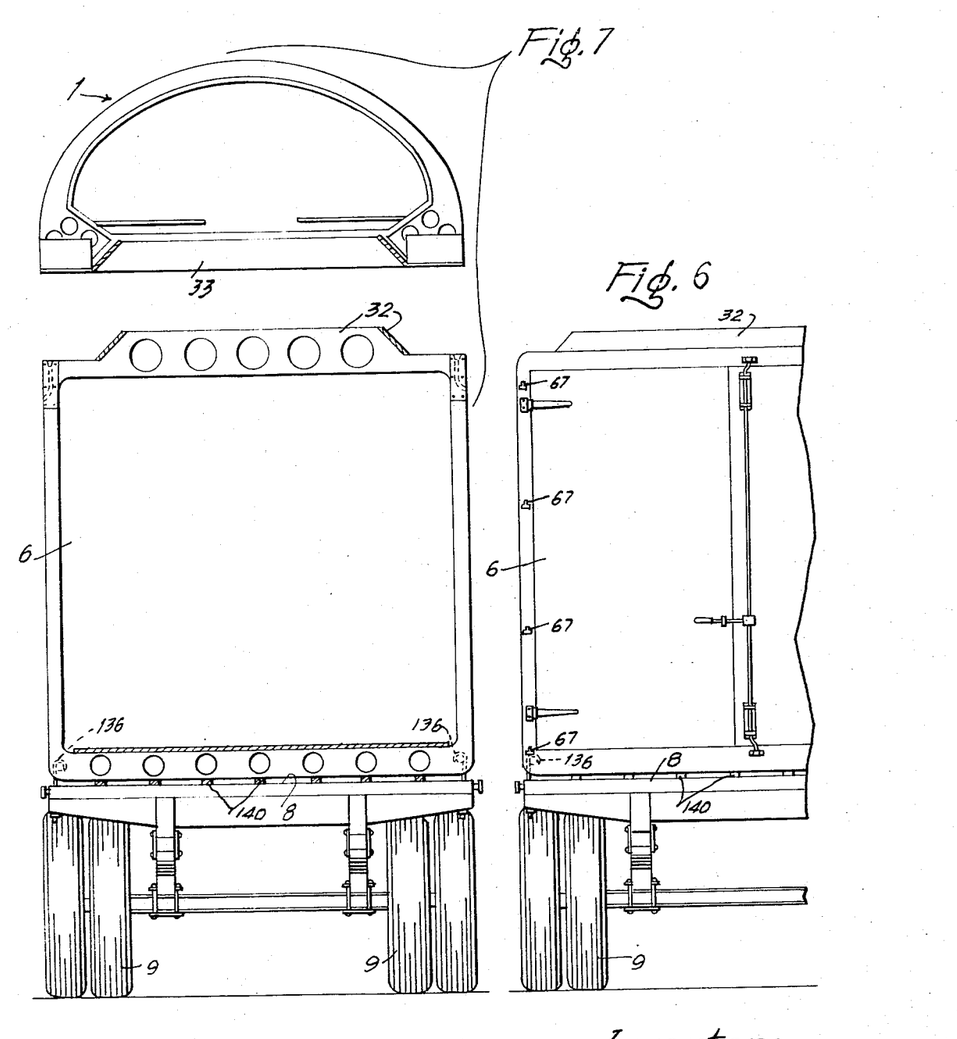
FIG. 6 is a fragmentary elevation view of the rear of the pod mounted on a chassis as a truck body.
FIG. 7 is an enlarged view in the broken plane 7—7 of FIG. 1.
Figure 8:
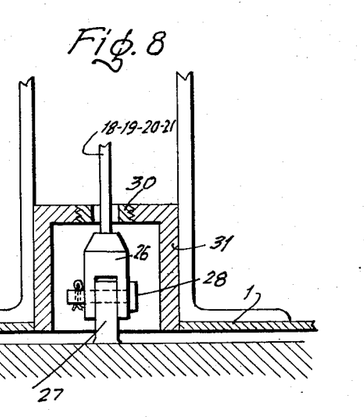
FIG. 8 is an enlarged view showing how the hoisting cables are connected to the pod or body of the truck.

Referring to FIGS. 4, 7 and 8, the top of the pod or truck body 6 is in the form of a truncated pyramid 32 and the bottom of the fuselage is provided with complementary recess surfaces 33 so that, as the pod or truck body is raised into contact with the fuselage, the two come into compressed abutment. The surfaces of the truncated pyramid and the surfaces of the complementary recess in the fuselage may be provided with resilient pads to insure a uniform bearing throughout when these surfaces are in close contact.

Figures 12, 13, 14, 15, 16:
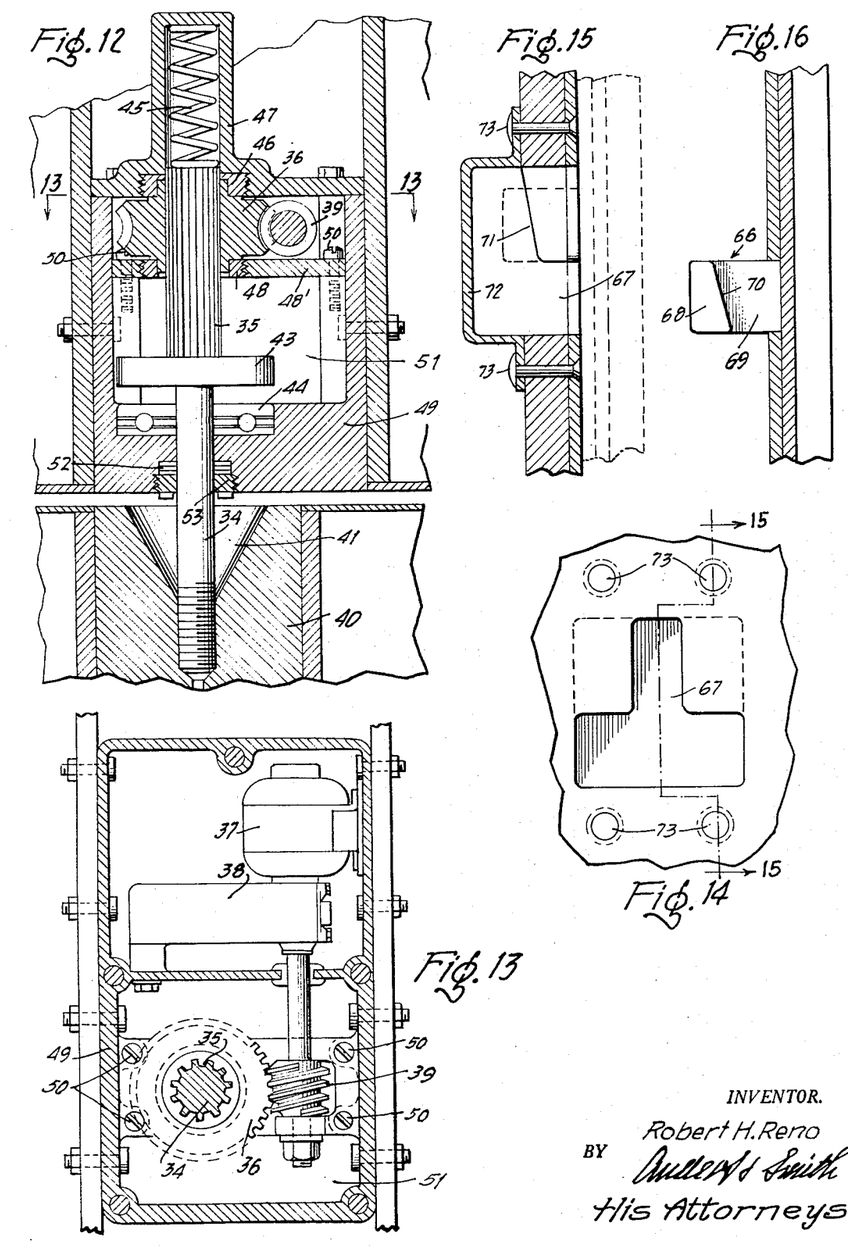
FIG. 12 is an enlarged sectional view of one of the pod-securing means carried by the airplane.
FIG. 13 is a section of FIG. 12 in the plane 13—13.
FIG. 14 is an enlarged view of one of the openings or keyways in the rear of the pod which function to secure the fairing thereto.
FIG. 15 is a section of FIG. 14 in the plane 15—15.
FIG. 16 is an enlarged fragmentary section of the fairing showing one of the keys which cooperate with the keyways shown in FIGS. 14 and 15 for securing the fairing to the pod.

When the truck body has been raised so that the complementary surfaces on the top thereof and on the bottom of the fuselage are in close contact, the body is securely attached to the fuselage as a pod by a plurality of securing means which are shown in FIGS. 12 and 13. These means comprise studs 34 which are slidably splined at the top, as shown at 35, to pinions 36 each of which is rotated by an electric motor 37, a reduction gearing 38, and a worm 39. These studs are threaded at the lower end to enable them to be screwed into corresponding female threads machined into structural members 40 of the pod. The members 40 are provided with a countersink 41 which functions as a centering medium for the guidance of the stud 34, and a drain hole 42 (see FIG. 4) is provided in the side of the pod for the discharge of rain water or other foreign material which might otherwise accumulate in the countersinks.

The studs have a machined collar 43 which is normally seated on thrust bearing 44 by compression from the spring 45 and from tension transmitted to the stud by the weight of the pod. The pinion 36 rotates on a bushing 46 which is threaded into the upper casing section 47 and a bushing 48 threaded into a structural support 48' which is secured to the lower casing section 49 by cap screws 50. The space 51 is a lubricant chamber, and to prevent the loss of lubricant along the stud 34, resilient packing rings 52 and a gland nut 53 are provided in the zone where the stud leaves the lower casing section 49.

Both the hoisting mechanism and the means for securing the pod to the airplane may be operated from electric push button stations which are well known in the art, or in any other suitable conventional manner. These stations can be placed at any desired location, such as a landing gear leg, to control electric circuits to the hoisting and securing mechanisms from a power source within the airplane.

The drag of the pod while the airplane is in flight is reduced by the fairing 11 which is provided with flanges 54, 55, 56 and 57 (see FIG. 4) which are shaped to bear against and mate with the adjoining surfaces of the fuselage and the pod when the fairing is attached thereto. The flanges 56 and 57 may have bonded thereto resilient compression strips to insure uniform bearing against the fuselage when the fairing is secured in place.

The fairing is raised into place and interlocked with the pod by the electro-mechanical linear actuators 58 and 59 which are well known in the art and which are remotely controlled in a manner similar to that previously described. The upper ends of the actuators are connected to the fuselage structure by couplings 60 and 61 and the lower ends are provided with clevises 62 and 63 which are connected to the upstanding eyed members 64 and 65 on the fairing by means of pins. In order to secure the fairing to the pod, tapered keys 66 (see FIGS. 4, 15 and 16) are inserted in complementary keyways 67 (see also FIG. 6) which are provided in the rear of the pod. Each key consists of a tapered cross arm 68 and a shank 69 which is welded or otherwise secured to the fairing.

The keyways are apertures cut through the pod former and skin on the rear end of the pod near the vertical edges, as shown in FIGS. 6, 14 and 15. The keyways 67 are shaped to permit the insertion of the keys 66 and to allow wedging of the tapered surfaces 70 of the cross arm 68 with the complementary tapered surfaces 71 inside the upper portion of the keyway, thus securing the fairing to the pod and to the fuselage by the upward pull of the actuators 58 and 59. Covers 72 in the form of hat sections are attached to the inner side of the pod by rivets 73 to prevent rain water or other foreign material from entering the interior of the pod by way of the apertures 67.

Figure 17:
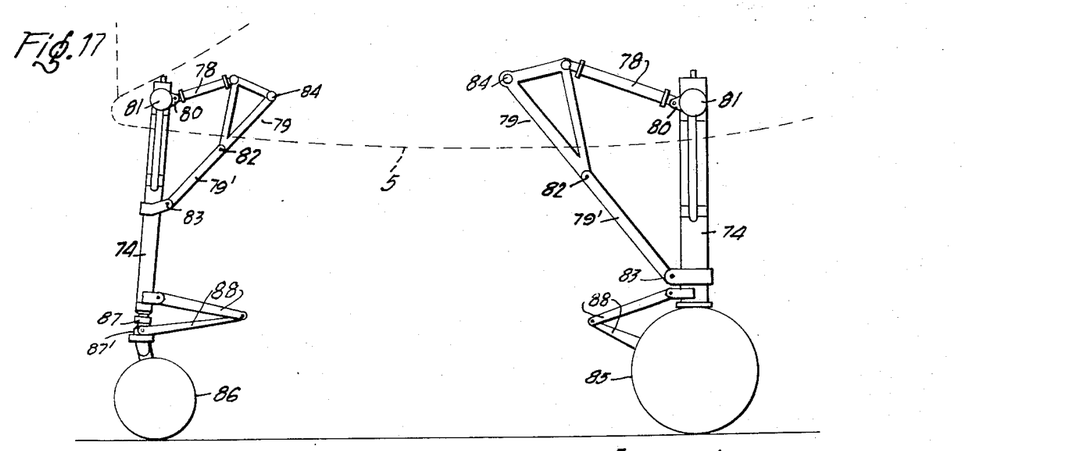
FIG. 17 is a side elevation showing the linkage arrangement of the landing gear in its normal ground position.
Figure 18:
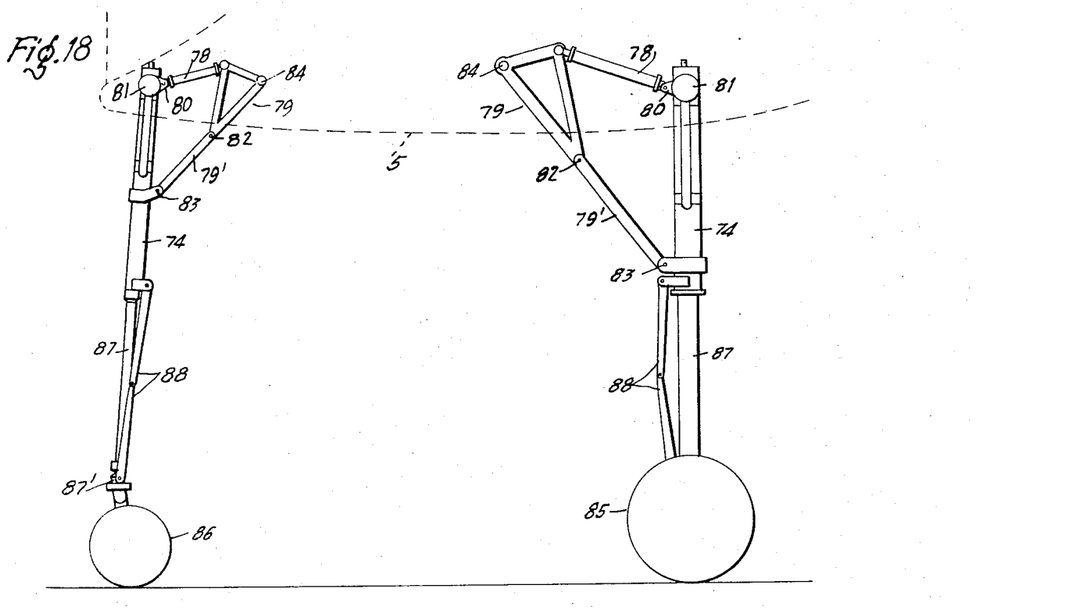
FIG. 18 is a view similar to FIG. 17 but showing the landing gear struts extended to raise the airplane so that a trailer truck may be driven beneath it.
Figure 19:
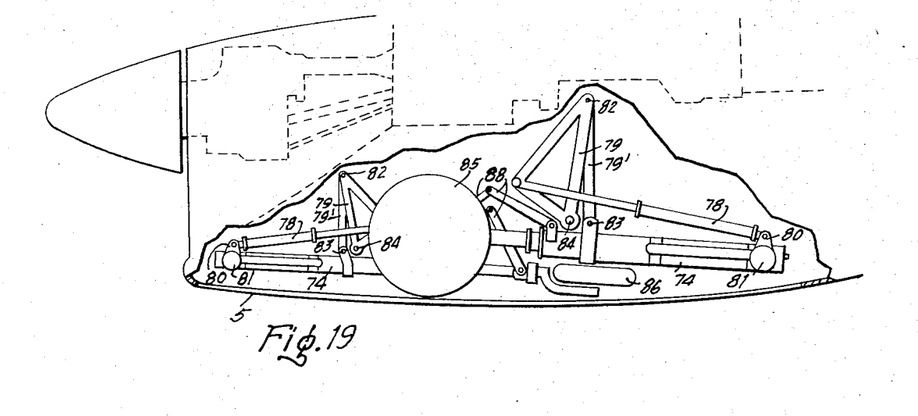
FIG. 19 is a side elevation view of the landing gear in its retracted, flight position.

Referring now to FIGS. 17, 18 and 19 which show the forward and rear landing gears, and since they are of substantially the same construction, the same numerals have been used to indicate similar elements in each. Each gear leg comprises a strut 74 which is pivotally mounted at its upper end to the structural frame of the nacelle by means of pillow blocks 75 (see FIGS. 20 and 23), preferably having self-aligning bushings, and bearings 76 which are enclosed in dust-proof housings 77. Each nacelle has a pair of landing gear legs associated therewith which, when the plane is in flight, are retracted into the nacelle as shown in FIG. 19, but are extended for landing, as shown in FIG. 17, by means of hydraulic linear actuators 78. The actuators are pivotally connected to drag strut links 79 and the outer ends of the bell cranks 80 which are fixed parts on the cross arms 81. Each of the drag struts is shown as comprising two links 79 and 79' pivotally connected together at 82. The links 79' are pivotally connected to the drag link fitting of the strut at 83, and the links 79 are pivotally connected to a structural member of the nacelle at 84. Links 79 are triangular members which act as bell cranks, causing the two links 79 and 79' to fold substantially upon each other when the landing gear is retracted. The landing wheels 85 and 86 are carried by pistons 87' which are part of shock absorbers of the oleo or pneumatic type that are incorporated in the telescopically extensible part 87 of the landing strut 74. Torsion scissors 88 prevent the pistons from rotating and insure positive alignment of the landing gear elements connected therewith. The wheels 86 of the forward landing gear legs are preferably provided with castering mechanisms, such as are well known in the art, and which permit the wheels 86 to pivot against a stop to the position shown in FIG. 19 when the gear is retracted.

The operation of engaging or disengaging and transferring the pod is effected by first elevating the aircraft, as shown in FIGS. 1 and 18, by telescopically extending the landing gear struts 74. The struts 74 are retracted when the landing gear is retracted into the engine nacelles 5. These struts may be of the hydraulic type shown in FIG. 20 or of the electro-mechanical type shown in FIG. 23.

Figures 20, 21, 22:
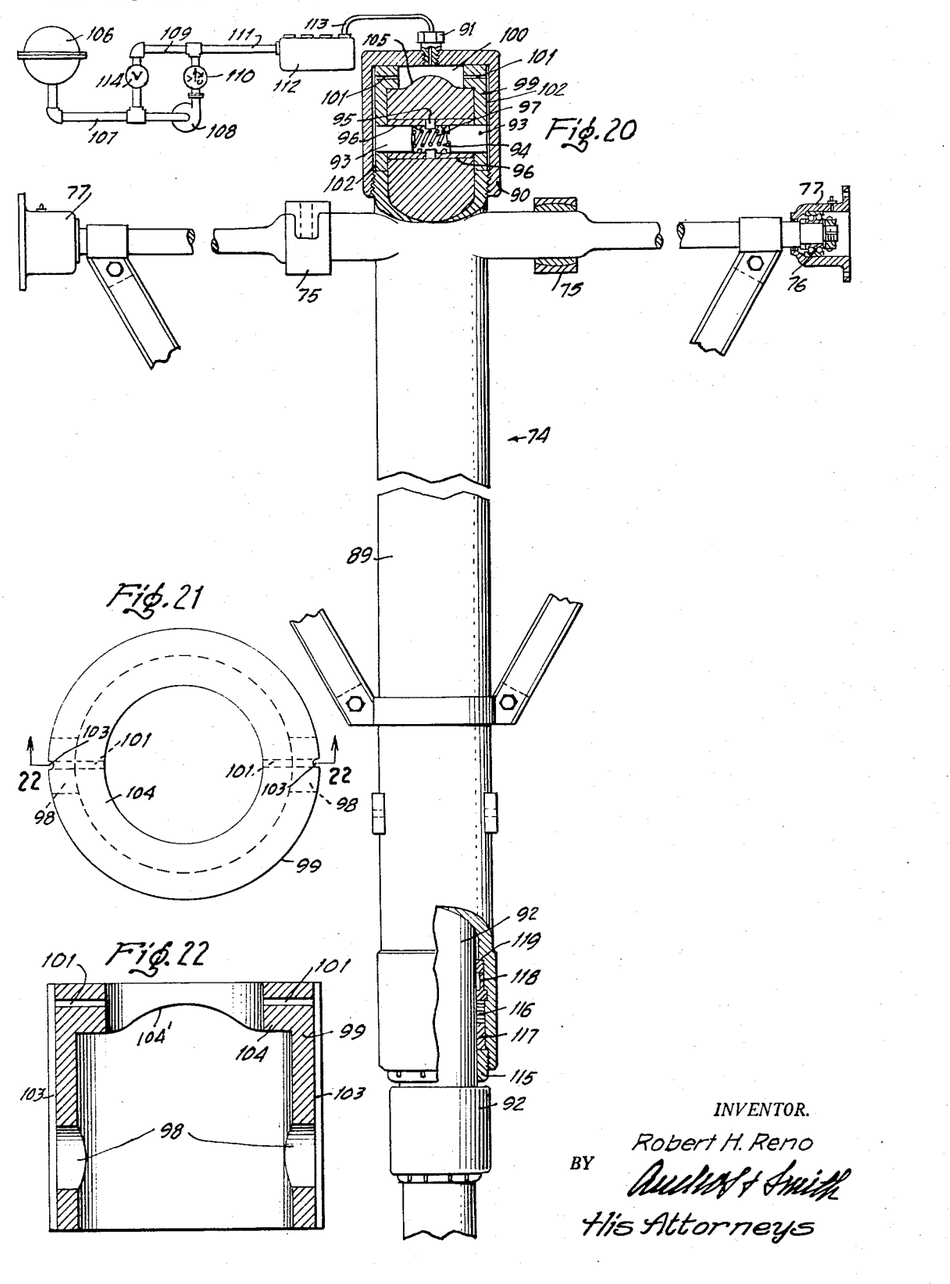
FIG. 20 is an enlarged elevation view, partly in section, of one of the landing gear struts and, diagrammatically, the hydraulic means for extending said strut.
FIG. 21 is an enlarged top view of one of the elements of the strut-extending mechanism.
FIG. 22 is a section of FIG. 21 in the plane 22—22.

The hydraulic type comprises an outer cylinder 89 which is closed at its upper end by a cap 90 having a hydraulic line attached thereto by a fitting 91. Telescoping within the cylinder 89 is a piston 92 embodying the aforementioned shock absorbers and equipped with a locking arrangement to prevent extension when it is not desired. The locking arrangement comprises two pins 93 linked by a bellows 94 which is hermetically sealed and attached to the pins and the centering ring 95 which is sandwiched between the bushings 96. By means of the spring 97 the pins are normally held extended into holes 98 of the sleeve 99 (see also FIGS. 21 and 22) but are retracted by the pressure of the hydraulic fluid pumped into the chamber 100 which flows therefrom through the radial ports 101 in the sleeve 99, and into the passageways 102 provided by grooves 103 in the outer surface of the sleeve 99. The top of the sleeve is provided with an inner flange 104 having a curved surface 104', and the top of the shock cylinder is provided with a surface 105 complementary thereto in order to insure exact alignment of the pins 93 and the holes 98 in the sleeve 99.

The hydraulic arrangement for actuating the device shown in FIG. 20 is illustrated diagrammatically but should be readily understood by anyone familiar with the art. A hydraulic accumulator 106 is mounted in a convenient location in the plane from which a conduit 107 leads to a pump 108. A by-pass 109 extends around the pump and is provided with a valve 114 which is operable from a desired point in the plane. The pump is equipped with a check valve 110 to prevent back flow. From the junction of the by-pass and the pump discharge another conduit 111 leads to a hydraulic flow equalizer 112 which proportions the flow to each of the four landing gear struts through conduits such as shown at 113. The piston 92 is extended by operating the pump 108 during which time the valve 114 is closed, and the piston is retracted by opening valve 114 to allow the back flow of the hydraulic fluid through the conduits by virtue of the weight of the plane. To prevent leakage of the hydraulic fluid, the lower end of the cylinder 89 is provided with a stuffing box assembly comprising a gland nut 115 threaded to the inside of the cylinder, and a packing 116 which is compressed between the gland ring 117 and the bushing 118 bearing on a shoulder 119 machined in the inside of the cylinder. Pneumatic means can readily be substituted by one skilled in the art for the hydraulic means for elevating the airplane. Such substitution, of course, comes within the scope of the invention as contemplated herein.

Figure 23:
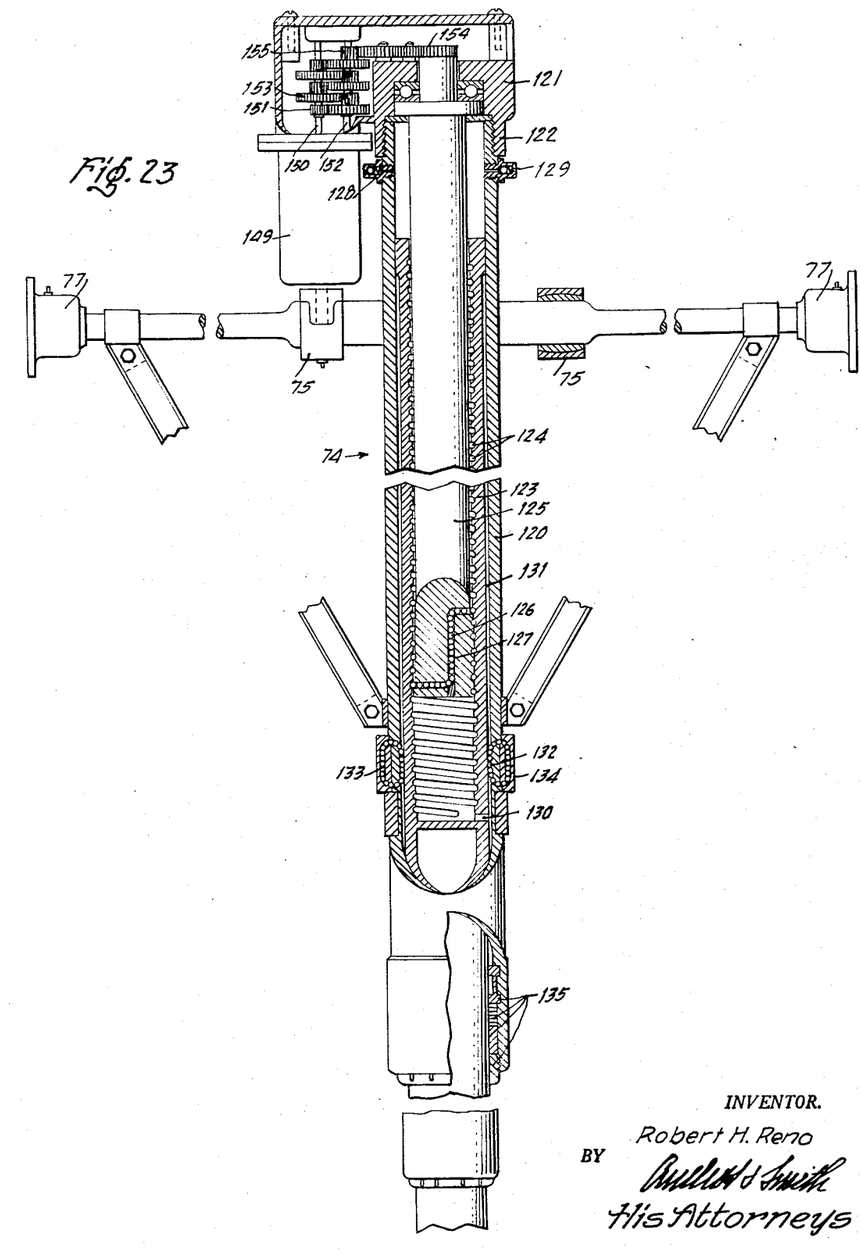
FIG. 23 is an elevation view, partly in section, showing an electro-mechanical means for extending the strut which may be used instead of the hydraulic arrangement shown in FIG. 20.

An alternate electro-mechanical gear arrangement for elevating the plane is shown in FIG. 23. This mechanism comprises a cylindrical leg 120 closed at its upper end by a gear reduction housing 121 having an internally threaded tubular neck 122 which is screwed onto the top of the leg 120. Telescopically mounted within the leg 120 is a cylinder 123 having its upper portion axially drilled and having a helical groove 124 machined therein to the full depth of the bore and within which a helically grooved drive shaft 125 rotates. The opposing grooves in the cylinder 123 and in the drive shaft 125 form a raceway which is part of a closed circuit through which a plurality of rolling balls 126 recirculate continually. An internal passage 127 in the drive shaft communicating with the two extremities of the raceway completes the closed circuit near the lower end of the drive shaft.

While the telescoping arrangement is fully collapsed oil is injected by removing one of the spring-loaded check valves 128 and 129 near the upper end of the cylindrical leg 120 and filling to overflow. Valve 128 permits air venting to the chamber above cylinder 123 during the strut extension and valve 129 allows air expulsion during the retraction of the cylinder.

During the operation of the mechanism, oil is caused to issue through an orifice 130 interconnecting the chamber immediately below the shaft 125 and the annular space 131 between the cylinder 123 and the leg 120, thereby insuring complete lubrication of all moving parts. Rotary motion of cylinder 123 is prevented by ball bearing splines built into each of the landing gear struts. Each spline is composed of a plurality of balls 132 which are continously recirculated in a closed circuit comprising a return passageway 133 and the raceway formed by axially extending grooves on the outer surface of the cylinder 123 and the inner surface of the leg 120. The return passageway consists of two holes bored through the wall of the leg 120 which are interconnected by the section of the pasageway machined within the wall of the cylinder 134 which is shrunk on the leg 120. A stuffing box assembly 135 which is similar to the stuffing box described in connection with FIG. 20 is employed to prevent leakage of the lubricating oil.

The shaft 125 is driven by the electric motor 149 which drives shaft 150 to which the small gear 151 is keyed. All of the other gears on shaft 150 can turn freely on said shaft, and all the gears on shaft 152 turn freely thereon. Each of the gears on shaft 152 and each of the gears on shaft 150, except 151, consists of a large gear and a small gear secured to the top of the large gear. The lowermost gear on shaft 152 is driven by gear 151 on the motor shaft 150. The small gear on top of the lowermost gear on shaft 152 drives the lowermost large gear on the motor shaft, and the small gear secured to the top thereof drives the lowermost large gear 153 on the motor shaft. The gear 154, which drives shaft 125 is driven by the topmost small gear 155 on shaft 152 through idlers which are not numbered.

The strut extension devices are controlled by the pilot or a ground crew member from a conveniently located push button station.

Elevating the airplane and pod combination by either of the above described telescoping strut structures enables the truck chassis to be properly located beneath the pod, thereby allowing the pod to be lowered to the chassis of the truck or trailer by means of the previously described hoist arrangement.

Figure 9:
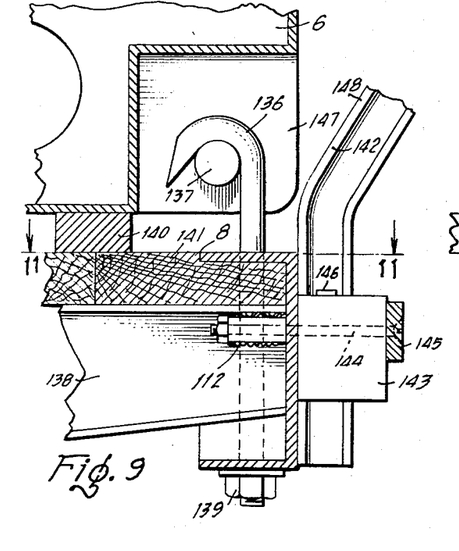
FIG. 9 is an enlarged view, partially in section, showing how the pod is secured to the truck, and showing a fragmentary portion of one of the guides which function properly to align the pod or body of the truck with its chassis when it is being lowered thereon.
Figure 10:
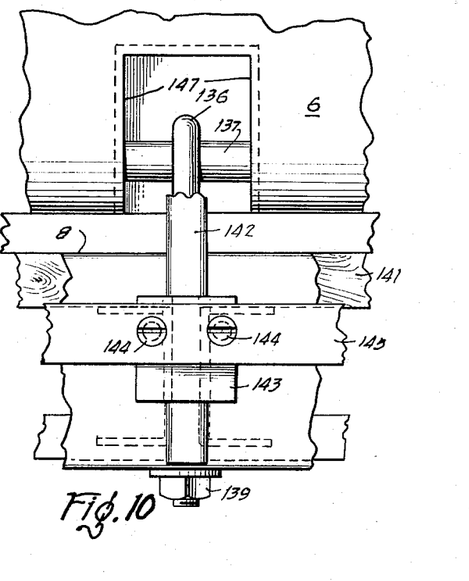
FIG. 10 is a right-hand view of the parts shown in FIG. 9.

Referring to FIGS. 9 and 10, the body or pod is secured to the chassis by a plurality of hooks 136 (see also FIGS. 6 and 7) which engage bars 137 which are secured to the structure of the pod or body. The shanks of the hooks extend through the outriggers 138 of the chassis and are threaded at the lower end to receive nuts 139 which provide a rigid anchorage. Skids 140, preferably in the form of rectangular bearing strips, are made from a tough material and secured to the under side of the pod or body. They make contact with the flooring 141 of the chassis.

Figure 11:
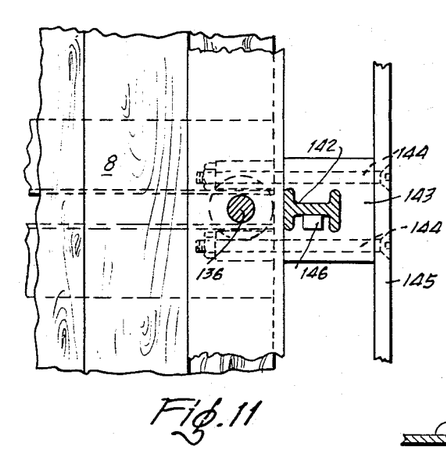
FIG. 11 is a section of FIG. 9 in the plane 11—11.

When the transfer of the pod from the airplane to the chassis is made, a plurality of guides which are located adjacent the body attachment fittings on the chassis are employed as a means of laterally positioning the pod as a body on the chassis. In FIGS. 9, 10 and 11 one of these guides 142 is shown as an I-beam. The guides are inserted vertically into complementary openings through structural fittings 143 which are rigidly attached to the trailer outriggers 138. As shown in FIG. 11, the fittings are secured by bolts 144 passing through the trailer side bumpers 145, the fitting 143 and the lug 112 welded to the outrigger. A protuberance 146 on the side of each guide seats on the fitting, thereby preventing further penetration and fixing the point of angular deflection of the guide at a definite distance from the floor of the chassis. Misalignment between the pod or body and the chassis is corrected during the descent of the pod by permitting the bars 137 with their respective side plates 147 to straddle the upper flanges 148 of the guides and slide down the inclined surfaces thereof to an aligned position on the chassis.

In operation, the aircraft, after flight, is taxied and parked with the pod and fairings in locked engagement. The fairings are removed, the aircraft elevated and the trailer and pod positioned thereunder. The centering arms are inserted in their respective fittings on the trailer. The securing devices are disengaged and the pod lowered by means of the hoist whereupon the pod is secured to the trailer. The hoist cables are disengaged from the pod and retracted. The centering arms are removed from the trailer which is then driven away.

Another trailer with a replacement pod is positioned under the elevated aircraft, the cables are lowered and secured to the pod, the devices securing the pod to the trailer are disengaged and the pod is raised to engagement with the aircraft and secured thereto. The trailer is then removed from beneath the aircraft, the aircraft and attached pod lowered, the fairings are then attached and the aircraft is ready to taxi and take off.

Under certain conditions, especially heavily loaded aircraft, the pilot is often desirous of making as short a take-off run as possible to clear obstacles. This is best accomplished by longitudinally tilting the airplane to a predetermined optimum angle of attack.

Figure 24:
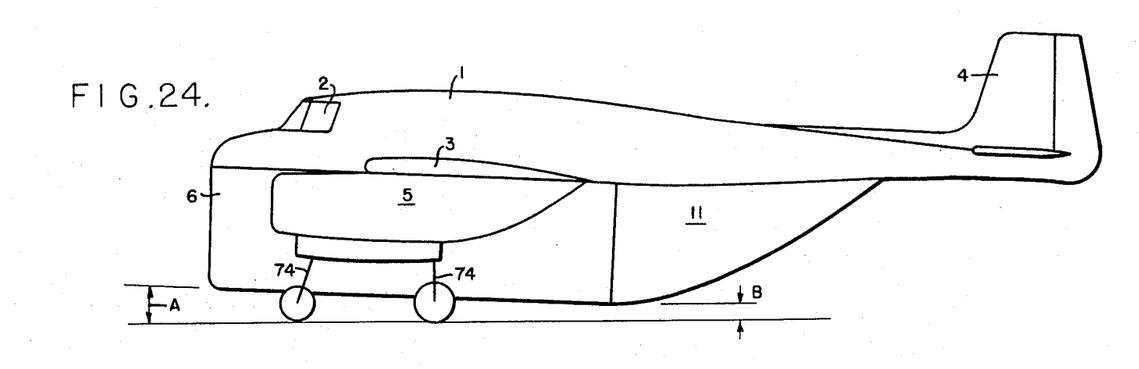
FIG. 24 is a view similar to FIG. 2 showing the airplane, ready for take-off, with its main landing gear shortened to secure optimum angle of attack for minimum take-off run.
Figure 25:
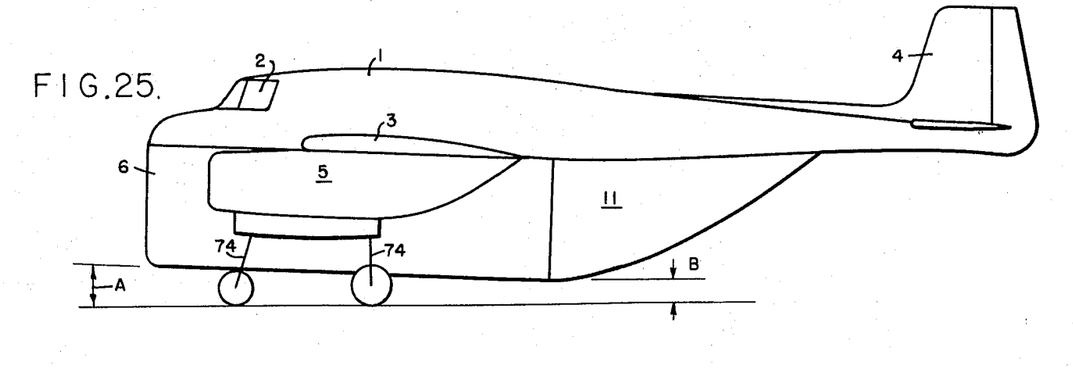
FIG. 25 is also a view similar to FIG. 2 showing the airplane, ready for take-off, with the nose gear slightly elongated to secure optimum angle of attack for minimum take-off run.

Referring to FIG. 24, the angle of tilt A of the aircraft is adjusted through telescopically shortening of the rear or main landing gear legs 74 by the mechanisms hereinbefore described. When taking off from rough terrain, additional ground clearance B is often necessary to prevent damage to the bottom of the aircraft. In this situation, the pilot may, in lieu of shortening the rear landing gear, extend the forward landing gear legs 74, as indicated in FIG. 25, to secure the aforementioned optimum angle of attack. Both of the foregoing actions may also be combined.

While I have described my invention in its preferred embodiment, it is to be understood that the words which I have used are words of description rather than of limitation and that changes, within the purview of the appended claims, may be made without departing from the true scope and spirit of my invention in its broader aspects.

I claim:

1. In an aircraft having a fuselage and landing gear, and a cargo-carrying container: sole elevating means cooperating with said landing gear for vertically elevating said aircraft, after it has landed, to permit said cargo-carrying container to be positioned beneath said fuselage; hoisting means mounted in said fuselage and cooperating with said container for raising it into final top nested position with the bottom of said fuselage; and securing means mounted in said fuselage for securing said container to said aircraft as a pod.

2. In an aircraft comprising a recessed fuselage, and a pod to be nested therein; an electric motor mounted in said fuselage; a worm driven by said motor; followers mounted on said worm to move toward and away from each other; cables connected to and actuated by said followers when moving toward each other for raising said pod into final nested position with said fuselage; and detachable means mounted in said fuselage for securing said pod to said fuselage.

3. The structure set fort hin claim 2 in which said worm has a portion thereof with right hand threads cooperating with one of said followers and a portion with left hand threads cooperating with another of said followers.

4. The combination with an aircraft having a fuselage and landing gear, and a cargo-carrying container in the form of a truck body mounted on a ground conveyance; of sole means cooperating with said landing gear for vertically elevating said aircraft to permit said cargo-carrying container to be positioned beneath said fuselage; means mounted in said fuselage cooperating with said container for raising it into final top nested position with the bottom of said fuselage; and means mounted in said fuselage for securing it to said aircraft as a pod; the top of said container having the form of a truncated pyramid and the bottom of said fuselage being provided with complementary recess means adapted to abut said pyramid when said container is raised into final engagement with said fuselage.

5. In an aircraft having a fuselage, landing gear and a cargo-carrying pod in the form of a truck body detachably secured to said fuselage, and a chassis of a truck adapted to receive said pod as its cargo-carrying body; sole means cooperating with said landing gear for raising said aircraft and pod to such an elevation that said chassis may be driven beneath said pod; means mounted within said fuselage for lowering said pod onto said chassis; and means adapted to cooperate with said pod and said chassis for securing said pod to said chassis as the body of said truck.

6. The combination with an aircraft having a fuselage and landing gear, and a cargo-carrying container in the form of a truck body mounted on a ground conveyance; of sole hydraulically actuated means cooperating with said landing gear for raising said aircraft to such an elevation above the ground that said cargo-carrying container may be positioned beneath said fuselage; means mounted in said fuselage cooperating with said container for raising it into contact with said fuselage; and means mounted in said fuselage for securing it to said aircraft as a pod.

7. The combination with an aircraft having a fuselage and landing gear, and a cargo-carrying container in the form of a truck body mounted on a ground conveyance; of sole electro-mechanical means cooperating with said landing gear for raising said aircraft to such an elevation above the ground that said cargo-carrying container may be positioned beneath said fuselage; means mounted in said fuselage cooperating with said container for raising it into contact with said fuselage; and means mounted in said fuselage for securing it to said aircraft as a pod.

8. The combination with an aircraft having a fuselage; of a cargo-carrying container in the form of a truck body having in the top thereof a plurality of spaced, internally threaded, vertical passages adapted to receive threaded studs; threaded studs carried by said fuselage for securing said container to said fuselage as a pod; said passages having comparatively large openings at the top thereof and sidewalls converging from said openings to the threaded portions thereof for guiding said studs; electric motors in said fuselage; and means, including worms driven by said motors, for rotating said studs to secure them in said threaded passages.

9. The structure set forth in claim 8 in which said studs slidably cooperate with said rotating means and are provided with springs biased by compression to force said studs downwardly.

10. In an aircraft having a fuselage and landing gear and a cargo-carrying container; hydraulically actuated means for extending said landing gear to raise said aircraft to such an elevation above the ground that said cargo-carrying container may be positioned beneath said fuselage; means mounted in said fuselage cooperating with said container for raising it into contact with said fuselage; means mounted in said fuselage for securing said container to said aircraft as a pod; and means, including a bellows, spring biasing means, a locking sleeve having a lock-receiving opening, and a locking element held seated within said opening by said spring biasing means cooperating with said hydraulically actuated means for automatically locking said landing gear extending means in retraction.

11. In an aircraft having a fuselage and landing gear, and a cargo-carrying container: sole elevating means cooperating with said landing gear for vertically elevating said aircraft, after it has landed, to permit said cargo-carrying container to be positioned beneath said fuselage; and hoisting means mounted in said fuselage and cooperating with said container for raising it into final connective relationship with the bottom of said fuselage.

12. In an aircraft comprising a recessed fuselage, and a pod to be nested therein: hoisting means mounted in said fuselage and cooperating with said pod for raising it into final connective relationship with the bottom of said fuselage; and a plurality of structurally independent, detachable driven-screw means mounted in said fuselage for securing with clamping force said pod to said fuselage.

13. In an aircraft having a fuselage and a cargo-carrying pod in the form of a truck body detachably secured to the bottom of said fuselage, and a chassis of a truck adapted to receive said pod as its cargo-carrying body: means mounted in said fuselage for lowering said pod onto said chassis; and detachable guide means mounted on said chassis and slidably cooperating with said pod, as it is lowered, for centering said pod on said chassis for mounting thereto as the body of said truck.

14. In an aircraft having a fuselage and a cargo-carrying pod detachably secured together, and a fairing: locking means provided on the rear of said pod; and corresponding locking means provided on said fairing; both of said locking means being adapted to cooperate in readily wedged engagement for securing said fairing in self-locking engagement with said pod by insertion and lateral pull to restraint.

15. In an aircraft having a fuselage with a recessed bottom; a cargo-carrying container having the top thereof nested in the bottom of said fuselage and secured thereto as a pod, said top and recessed bottom having abuttingly cooperating surfaces arranged as sides of a truncated pyramid extending substantially around the periphery of the top of said container, said container being in the form of a truck body; and a fairing detachably secured by wedged engagement to the rear of said body.

References Cited

UNITED STATES PATENTS

| | | | |
|---|---|---|---|
| 1,657,670 | 1/1928 | Fitch | 74—424.8 |
| 2,075,042 | 3/1937 | Knerr | 244—118 |
| 2,343,638 | 3/1944 | Bock | 244—118 X |
| 2,448,064 | 8/1948 | Wallace | 244—102 |
| 2,448,862 | 9/1948 | Conklin | 244—118 |
| 2,480,279 | 8/1949 | Belanger et al. | 244—118 |
| 2,481,379 | 9/1949 | Zimmerman | 244—102 X |
| 2,514,045 | 7/1950 | Gardenhire | 244—118 |
| 2,577,287 | 12/1951 | Sullivan | 244—118 |
| 2,578,578 | 12/1951 | Myers | 244—102 |
| 2,678,783 | 5/1954 | Myers | 244—102 X |
| 2,683,005 | 7/1954 | Frost | 244—118 |
| 2,781,226 | 2/1957 | Tydon | 244—118 X |
| 3,028,130 | 4/1962 | Burton | 244—118 |

FOREIGN PATENTS

| | | |
|---|---|---|
| 899,721 | 9/1944 | France. |
| 245,155 | 3/1912 | Germany. |
| 755,965 | 8/1956 | Great Britain. |

MILTON BUCHLER, *Primary Examiner.*

FERGUS S. MIDDLETON, *Examiner.*

A. E. CORRIGAN, T. W. BUCKMAN,
*Assistant Examiners.*